(12) United States Patent
Chamberlain

(10) Patent No.: US 9,376,156 B2
(45) Date of Patent: Jun. 28, 2016

(54) BICYCLE FRAME WITH ASSYMETRIC SEAT SUPPORT

(71) Applicant: Specialized Bicycle Components, Inc., Morgan Hill, CA (US)

(72) Inventor: Jason L. Chamberlain, Morgan Hill, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 34 days.

(21) Appl. No.: 14/082,782

(22) Filed: Nov. 18, 2013

(65) Prior Publication Data

US 2015/0137477 A1    May 21, 2015

(51) Int. Cl.
    *B62K 3/02*    (2006.01)
(52) U.S. Cl.
    CPC ........................................ *B62K 3/02* (2013.01)
(58) Field of Classification Search
    CPC .......................................................... B62K 3/02
    USPC .................................. 280/275, 283, 284, 285
    See application file for complete search history.

(56) References Cited

U.S. PATENT DOCUMENTS

| 494,803 A | 4/1893 | Cable |
|---|---|---|
| 5,121,937 A | 6/1992 | Lawwill |
| 5,509,679 A | 4/1996 | Leitner |
| 5,658,001 A | 8/1997 | Blanchard |
| 5,957,473 A | 9/1999 | Lawwill |
| 6,886,846 B2 | 5/2005 | Carroll |
| 7,350,797 B2 | 4/2008 | Carroll |
| 7,438,149 B2 * | 10/2008 | Ishida et al. ................... 180/227 |
| 2003/0193163 A1 * | 10/2003 | Chamberlain et al. ........ 280/284 |
| 2005/0046142 A1 * | 3/2005 | Chamberlain ................ 280/284 |
| 2012/0235379 A1 | 9/2012 | Trimble et al. |

* cited by examiner

*Primary Examiner* — Jacob Knutson
(74) *Attorney, Agent, or Firm* — Michael Best & Friedrich LLP

(57) ABSTRACT

A bicycle including front and rear wheels and a frame supported by the front and rear wheels. The rear wheel defines a central plane of the bicycle. The frame includes a main frame and a rear frame that is movable relative to the main frame. The main frame has a seat support with an offset portion that is offset from the central plane. The bicycle also includes a seat supported by the seat support, and a suspension unit coupled between the rear frame and the main frame to inhibit relative movement between the rear frame and the main frame. The suspension unit is positioned with the offset portion of the seat support laterally aligned with a first side of the suspension unit, and a second side of the suspension unit opposite the first side is not laterally aligned with the seat support.

20 Claims, 4 Drawing Sheets

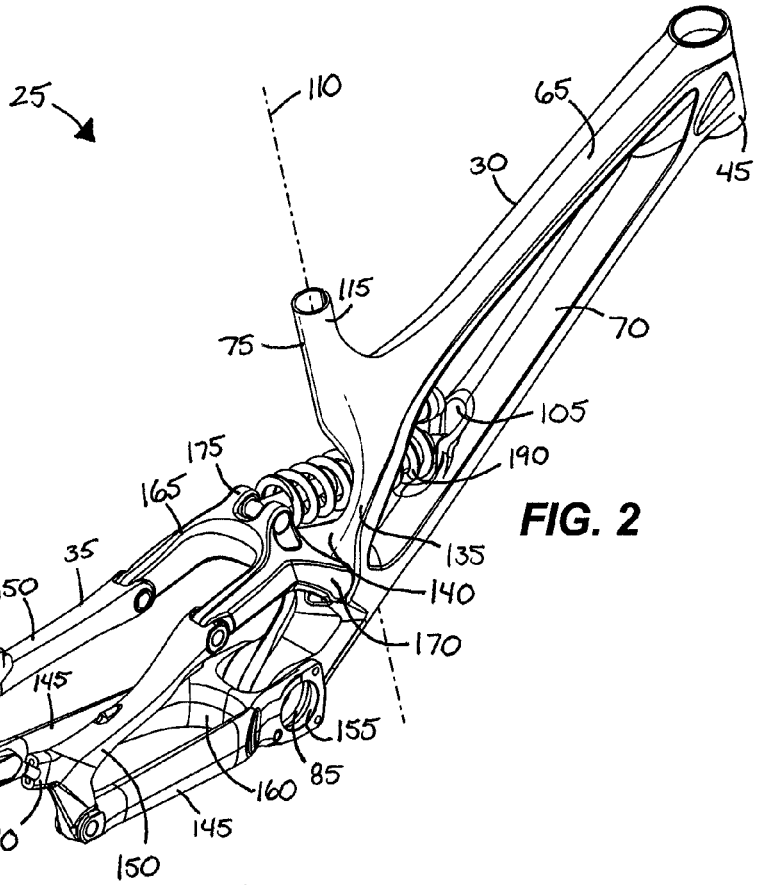
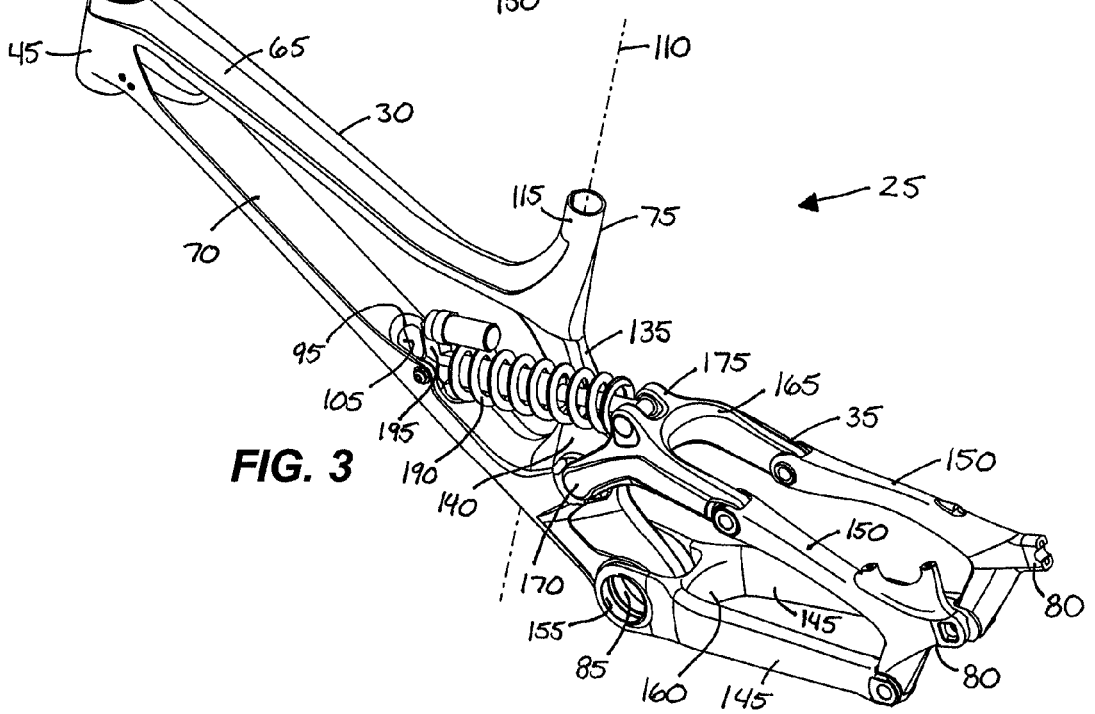

BICYCLE FRAME WITH ASSYMETRIC SEAT SUPPORT

BACKGROUND

The present invention relates generally to the field of bicycles and specifically to bicycle frames having a rear suspension.

Many modern bicycles have resilient suspension systems that facilitate a smoother ride over rough terrain. For example, some bicycles include a rear frame that is pivotably attached to a main frame, and shocks (e.g., springs or dampers) that cushion the rear end of the bicycle. Many rear suspension systems on existing bicycles have a single-pivot design (i.e. pivotable about a single pivot point) or a linkage-pivot design (typically a four-bar linkage). With existing rear suspension systems, it is often difficult to access the shock or other components for maintenance or replacement because the suspension systems connect to different parts of the bicycle frame.

SUMMARY

In one construction, the present invention provides a bicycle including front and rear wheels and a frame supported by the front and rear wheels. The rear wheel defines a central plane of the bicycle. The frame includes a main frame and a rear frame that is movable relative to the main frame. The main frame has a seat support with an offset portion that is offset from the central plane. The bicycle also includes a seat supported by the seat support, and a suspension unit coupled between the rear frame and the main frame to inhibit relative movement between the rear frame and the main frame. The suspension unit is positioned with the offset portion of the seat support laterally aligned with a first side of the suspension unit, and a second side of the suspension unit opposite the first side is not laterally aligned with the seat support.

In another construction, the present invention provides a bicycle frame assembly including a main frame and a rear frame movable relative to the main frame. The main frame and the rear frame define a central plane, and the main frame has a seat support with an offset portion that is offset from the central plane. The frame assembly also includes a suspension unit that is coupled between the rear frame and the main frame to inhibit relative movement between the rear frame and the main frame. The suspension unit is positioned with the offset portion of the seat support laterally aligned with a first side of the suspension unit, and a second side of the suspension unit opposite the first side is not laterally aligned with the seat support.

In another construction, the present invention provides a bicycle frame assembly including a main frame and a rear frame movable relative to the main frame. The main frame and the rear frame define a central plane, and the main frame has a frame member and a seat support with an offset portion that is coupled to the frame member. The frame assembly also includes a suspension unit that is coupled between the rear frame and the main frame to inhibit relative movement between the rear frame and the main frame. The offset portion extends along only one side of the suspension unit.

Other aspects of the invention will become apparent by consideration of the detailed description and accompanying drawings.

BRIEF DESCRIPTION OF THE DRAWINGS

FIG. 2 is a right perspective view of the frame assembly of FIG. 1 including a main frame, a rear frame, and a suspension unit coupled between the main frame and the rear frame.

FIG. 3 is a left perspective view of the frame assembly including a main frame, a rear frame, and a suspension unit coupled between the main frame and the rear frame.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
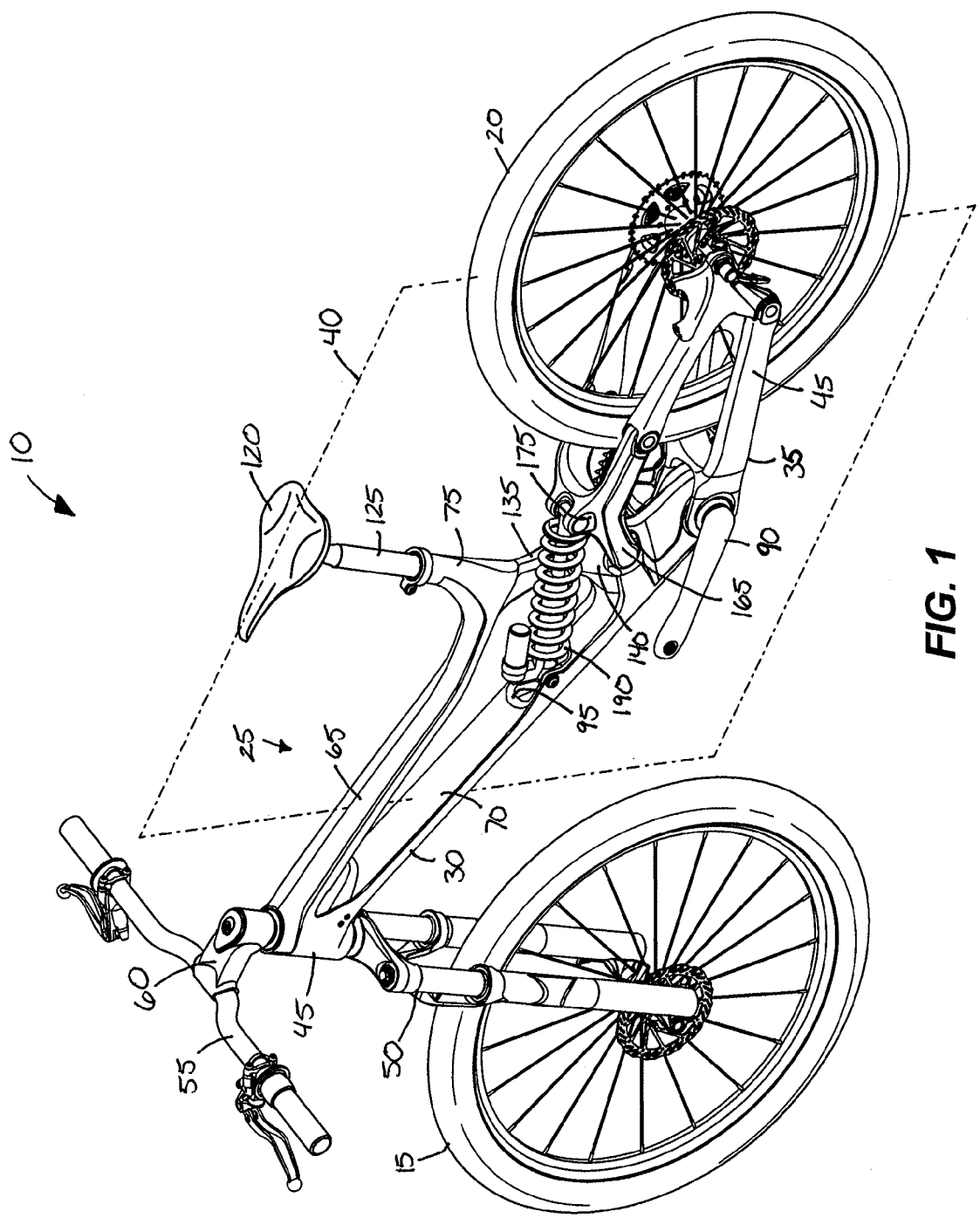
FIG. 1 is a perspective view of a bicycle including a frame assembly embodying the invention.
Figure 4:
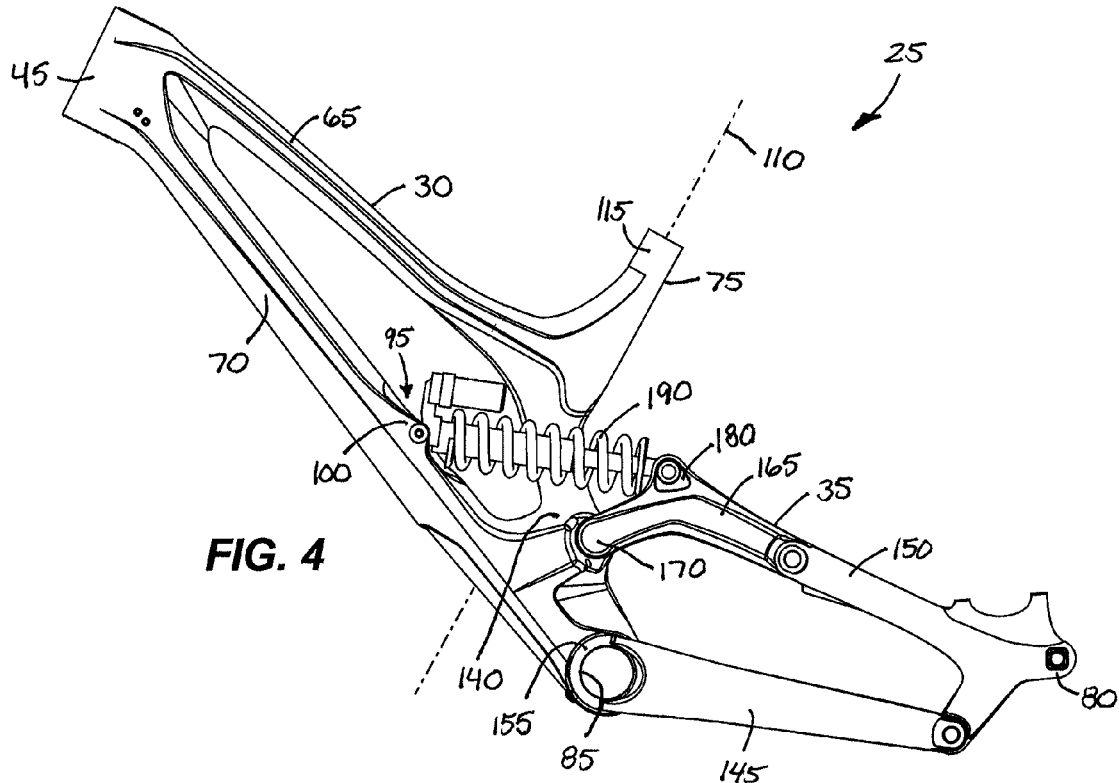
FIG. 4 is a left side view of the frame assembly of FIGS. 2 and 3 illustrating the suspension unit and a seat support that has an offset portion on one side of the suspension unit.
Figure 5:
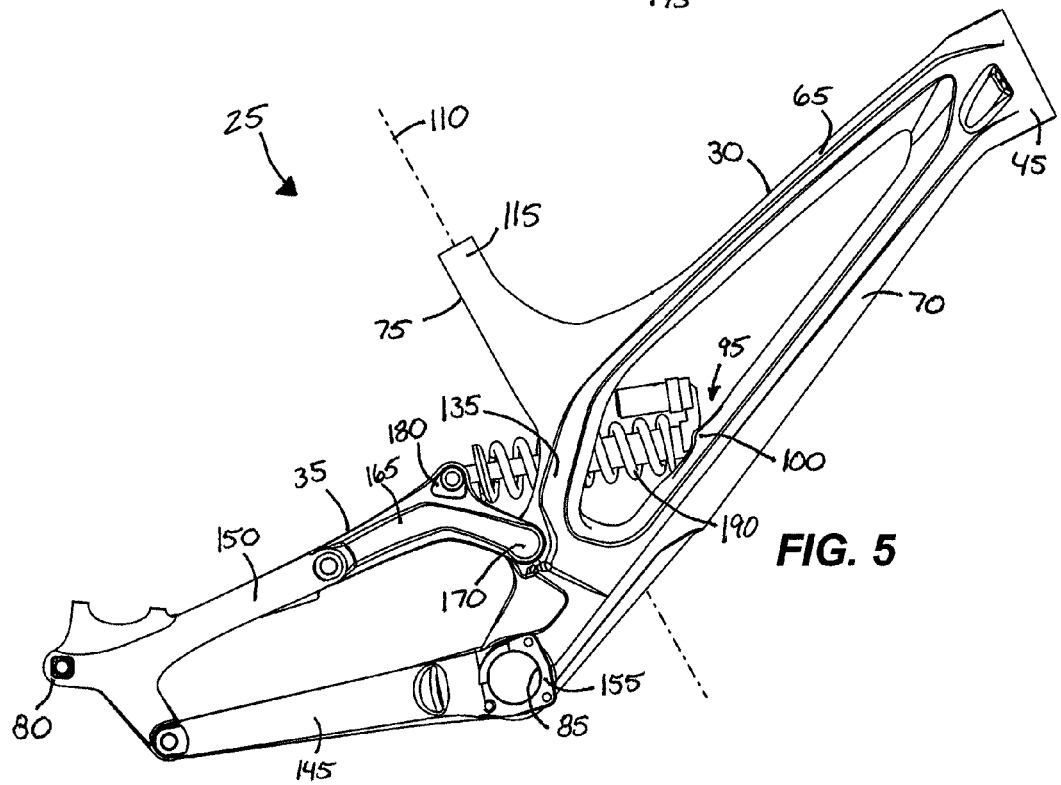
FIG. 5 is a right side view of the frame assembly of FIGS. 2 and 3 illustrating the suspension unit and the seat support with the offset portion.

FIG. 1 shows a bicycle 10 that includes a front wheel 15, a rear wheel 20, and a frame assembly 25 that has a main frame 30 and a rear frame 35. With reference to FIG. 1, the rear wheel 20 defines a central plane 40 of the bicycle 10. The main frame 30 has a head tube 45 and a front fork 50 that is rotationally supported by the head tube 45 and that secures the front wheel 15 to the main frame 30. A handlebar assembly 55 is coupled to the head tube 45 and is secured to the front fork 50 by a stem assembly 60 such that movement of the handlebar assembly 55 results in movement of the stem assembly 60 and the fork 50.

Figure 6:
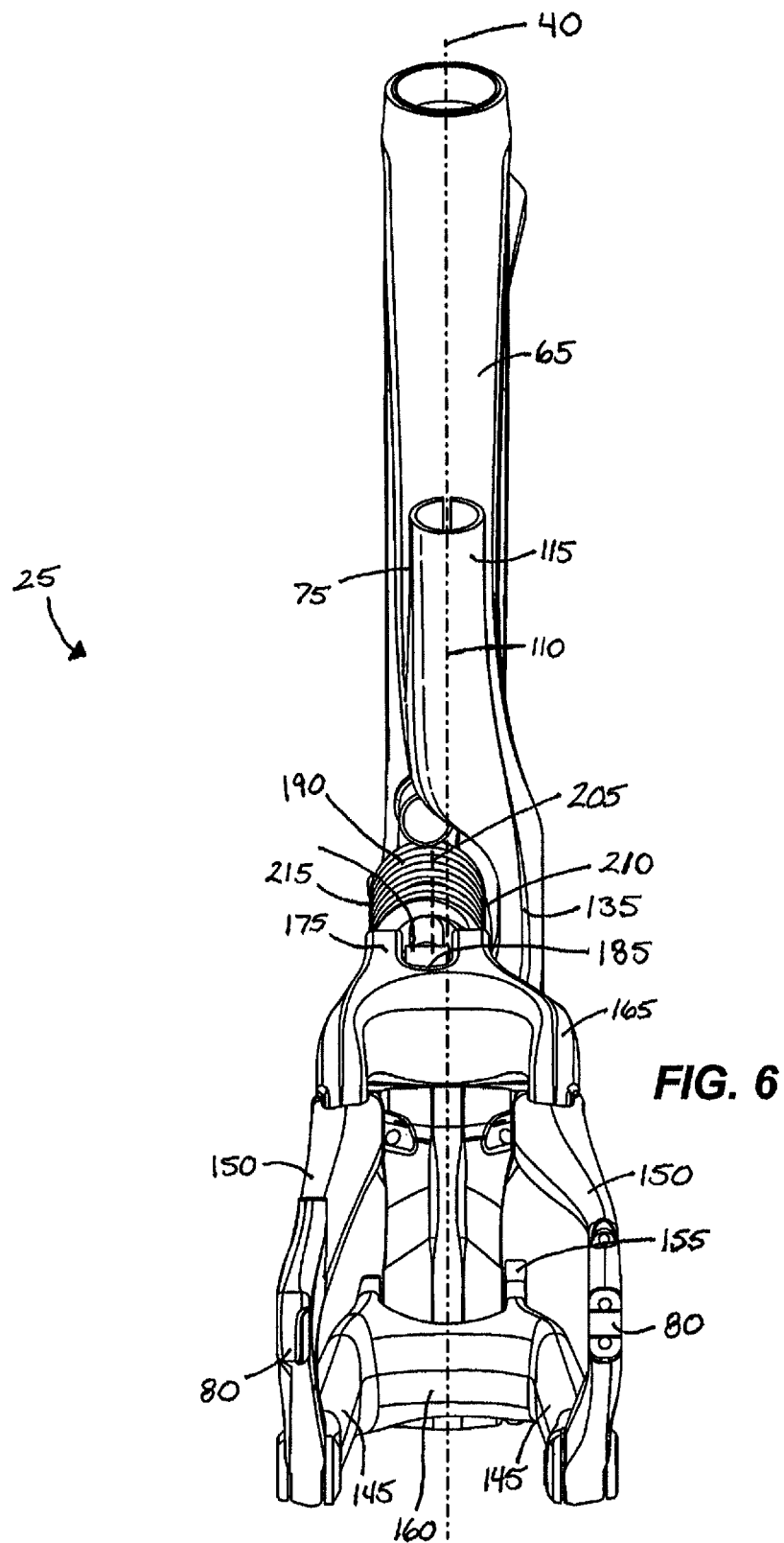
FIG. 6 is a rear view of the frame assembly of FIGS. 2 and 3 illustrating an upper portion of the seat support aligned with a central plane of the frame and the offset portion offset from the central plane.

As illustrated in FIGS. 1-6, the main frame 30 also has a top tube 65 and a down tube 70. The top tube 65 is connected to and extends rearward from the head tube 45 to a seat support 75. As shown in FIGS. 1 and 6, the central plane 40 also extends longitudinally through the top tube 65, the seat support 75, and centrally between rear dropouts 80 on the rear frame 35 such that the central plane 40 is separately defined by the main frame 30 and the rear frame 35.

The down tube 70 is connected to the head tube 45 below the top tube 65 and extends generally downward toward a bottom bracket 85 (see FIGS. 2-5) that supports a drive train 90. As illustrated, the down tube 70 has a first suspension attachment 95 located between the head tube 45 and the bottom bracket 85. The first suspension attachment 95 is defined by opposed first mounting flanges 100 and a recess 105 disposed in the down tube 70 between the first mounting flanges 100.

Referring to FIG. 1, the seat support 75 defines a seat axis 110 and has an upper portion 115 that supports a seat 120 and that is connected to (e.g., formed with) the top tube 65. As illustrated, the seat 120 is coupled to a seat post 125 that is disposed in and secured to the upper portion 115 (e.g., via a clamp). The seat 120 is height-adjustable along the seat axis 110 by varying the depth that the seat post 125 is inserted into the seat support 75.

With reference to FIGS. 1-6, the seat support 75 also has an offset portion or bridge 135 extending between the upper portion 115 and a base portion 140 that is coupled or connected to the down tube 70. The illustrated bridge 135 is disposed on the drive side of the bicycle 10, although the bridge 135 alternatively can be on the non-drive side of the bicycle 10. As illustrated in FIG. 6, the bridge 135 is offset from the central plane 40 and the seat axis 110, and extends from the upper portion 115 and the base portion 140 parallel or substantially parallel (i.e. nearly parallel) to the central plane 40. More specifically, the bridge 135 is laterally spaced or offset relative to the central plane 40 such that the bridge 135 does not intersect the central plane 40. In the illustrated construction, the bridge 135 extends between the upper portion 115 and the base portion 140 on only one side of the central plane 40.

As best shown in FIGS. 2-5, the rear frame 35 connects the main frame 30 to the rear wheel 20, and the rear frame 35 is movable (e.g., pivotable) relative to the main frame 30. As illustrated, the rear frame 35 includes right and left chain stays 145, and right and left upper stays 150. The chain stays 145 and the upper stays 150 are coupled to each other at the rear dropouts 80. The chain stays 145 extend forward from and are pivotally coupled to the rear dropouts 80, and the chain stays 145 are further pivotally connected to the main frame 30 at a first pivot 155. The illustrated first pivot 155 is coincident with the bottom bracket 85, although the first pivot 155 can be offset (e.g., above) the bottom bracket 85. A frame link 160 extends laterally between the chain stays 145 to assist with stiffening the rear frame 35.

The illustrated rear dropouts 80 rotationally secure the rear wheel 20 to the rear frame 35 and are formed on a rear end of the upper stays 150, although the rear dropouts 80 can be separate frame elements that are rigidly attached to the upper stays 150. The upper stays 150 extend forward from the rear dropouts 80 and are pivotally connected to a stay link 165 extending between the upper stays 150 and the main frame 30. The stay link 165 is pivotally connected to the main frame 30 at a second pivot 170 on the main frame 30 located adjacent or at the juncture between the down tube 70 and the base portion 140 (e.g., on the rearward side of the main frame relative to the direction of travel for the bicycle). The illustrated stay link 165 is curved or bent and includes a second suspension attachment 175 disposed on the stay link 165 between the first pivot 155 and the pivotal connection to the upper stays 150 (e.g., at the crest or at the bend of the stay link 165). As shown in FIGS. 1-3, the second suspension attachment 175 is defined by opposed second mounting flanges 180 and a recess 185 in the stay link 165 between the second mounting flanges 180.

As illustrated and described, the rear frame 35 is defined by a four-bar linkage (i.e. the upper stays 150 and rear dropouts 80, the chain stays 145, the stay link 165, and the portion of the main frame 30 between the first and second pivot points 155, 170). This four-bar linkage is movable (e.g., pivotal) relative to the main frame 30 about the first pivot 155 and the second pivot 170. The four-bar linkage is also movable relative to the rear wheel 20 about the pivotal connections between the chain stays 145 and the upper stays 150, and the pivotal connections between the upper stays 150 and the stay link 165.

With reference to FIGS. 1-6, a suspension unit 190 (e.g., a shock or damper) is coupled between the main frame 30 and the rear frame 35 at the first and second suspension attachments 95, 175 to dampen or limit or inhibit relative movement between the rear frame 35 and the main frame 30. As illustrated, the suspension unit has a forward mount 195 that is pivotally attached to the first mounting flanges 100 (e.g., via a bolt or pin connection), and a rearward mount 195 that is pivotally attached to the second mounting flanges 180 (e.g., via a bolt or pin connection).

The illustrated suspension unit 190 extends alongside the seat support 75 and intersects the central plane 40. With continued reference to FIG. 6, the suspension unit 190 is also offset from the central plane 40. That is, the suspension unit 190 is slightly shifted laterally relative to the central plane 40 (toward the non-drive side of the bicycle) such that a longitudinal centerline axis 205 of the suspension unit 190 is offset or spaced from the central plane 40. In some constructions, the suspension unit 190 can be aligned with the central plane 40 such that the centerline axis 205 is on the central plane 40.

The suspension unit 190 is positioned with the bridge 135 laterally aligned with a first side 210 of the suspension unit 190 (the right side of the suspension unit 190 as viewed in FIG. 6). A second side 215 of the suspension unit opposite the first side 210 (the left side of the suspension unit 190 as viewed in FIG. 6) is not laterally aligned with the seat support 75. In other words, the bridge 135 is on one side of the suspension unit 190 and no portion of the seat support 75 is on the other (i.e. opposing) side of the suspension unit 190. With continued reference to FIGS. 1-6, the bridge 135 extends only along the first side of the suspension unit 190 (i.e. the main frame 30 does not have a frame member adjacent the suspension unit 190 on the non-drive side of the bicycle 10). The base portion 140 extends (e.g., curves) generally downward and toward the central plane 40 from the bridge 135 such that the suspension unit 190 is disposed partially over or above the base portion 140. That is, the seat support 75 is at least partially aligned with the central plane 40 at the base portion 140.

The suspension unit 190 can be accessed or removed or installed from adjacent the second side 215 of the suspension unit 190 (i.e. the side opposite the bridge 135). As illustrated in FIG. 6, the suspension unit 190 is accessible and removable from the left side of the main frame 30 without the main frame 30 interfering with accessibility to the suspension unit 190. In other words, the bridge 135 provides open access to the suspension unit 190. By providing the main frame 30 with a seat support 75 that has a bridge 135 on only one side of the suspension unit 190, the suspension unit 190 and its components can be accessed on the side of the frame assembly 25 opposite the bridge 135. In addition, the main frame 30 can accommodate suspension units across a wide spectrum of sizes without adversely affecting the strength and rigidity provided to the seat support 75 because the bridge 135 is on only one side of the suspension unit 190.

Various features of the invention are set forth in the following claims.

The invention claimed is:

1. A bicycle comprising:
   front and rear wheels, the rear wheel defining a central plane of the bicycle;
   a frame supported by the front and rear wheels, the frame including a main frame and a rear frame movable relative to the main frame, the main frame having a seat support with a portion that is offset from the central plane;
   a seat supported by the seat support; and
   a suspension unit coupled between the rear frame and the main frame to inhibit relative movement between the rear frame and the main frame, wherein the suspension unit is positioned with the offset portion laterally aligned with a first side of the suspension unit, and wherein a second side of the suspension unit opposite the first side is not laterally aligned with the seat support.

2. The bicycle of claim 1, wherein the offset portion does not intersect the central plane.

3. The bicycle of claim 1, wherein the suspension unit intersects the central plane.

4. The bicycle of claim 1, wherein a centerline of the suspension unit is offset from the central plane.

5. The bicycle of claim 1, wherein substantially the entire suspension unit is accessible from the second side.

6. The bicycle of claim 1, wherein a position of the seat is adjustable along a seat axis, and wherein the offset portion is laterally aligned with the seat axis.

7. The bicycle of claim 1, wherein a front portion of the suspension unit is coupled to the main frame and a rear portion of the suspension unit is coupled to the rear frame.

8. The bicycle of claim 1, wherein a front portion of the suspension unit is pivotally coupled to the main frame and a rear portion of the suspension unit is pivotally coupled to the rear frame.

9. A bicycle frame assembly comprising:
a main frame and a rear frame movable relative to the main frame, the main frame and the rear frame defining a central plane, the main frame having a seat support with an offset portion that is offset from the central plane; and
a suspension unit coupled between the rear frame and the main frame to inhibit relative movement between the rear frame and the main frame, wherein the suspension unit is positioned with the offset portion laterally aligned with a first side of the suspension unit, and wherein a second side of the suspension unit opposite the first side is not laterally aligned with the seat support.

10. The bicycle frame assembly of claim 9, wherein the offset portion does not intersect the central plane.

11. The bicycle frame assembly of claim 9, wherein the suspension unit intersects the central plane.

12. The bicycle frame assembly of claim 9, wherein a centerline of the suspension unit is offset from the central plane.

13. The bicycle frame assembly of claim 9, wherein substantially the entire suspension unit is accessible from the second side.

14. The bicycle frame assembly of claim 9, wherein the seat support is adapted to support a seat and facilitate adjustment of the seat along a seat axis, and wherein the offset portion is laterally aligned with the seat axis.

15. The bicycle frame assembly of claim 9, wherein a front portion of the suspension unit is coupled to the main frame and a rear portion of the suspension unit is coupled to the rear frame.

16. The bicycle frame assembly of claim 9, wherein a front portion of the suspension unit is pivotally coupled to the main frame and a rear portion of the suspension unit is pivotally coupled to the rear frame.

17. A bicycle frame assembly comprising:
a main frame and a rear frame movable relative to the main frame, the main frame and the rear frame defining a central plane, the main frame having a frame member and a seat support having only a single offset portion, wherein the single offset portion is coupled to the frame member; and
a suspension unit coupled between the rear frame and the main frame to inhibit relative movement between the rear frame and the main frame,
wherein the offset portion extends along only one side of the suspension unit.

18. The bicycle frame assembly of claim 17, wherein the suspension unit intersects the central plane.

19. The bicycle frame assembly of claim 17, wherein the offset portion is offset from the central plane.

20. The bicycle frame assembly of claim 17, wherein substantially the entire suspension unit is accessible and removable from a side of the frame opposite the offset portion.

* * * * *